United States Patent [19]

Booth

[11] Patent Number: 5,406,468
[45] Date of Patent: Apr. 11, 1995

[54] METHOD FOR MINIMIZING OUTPUT TRANSIENT RESPONSES IN A POWER SUPPLY

[75] Inventor: James R. Booth, Cary, Ill.

[73] Assignee: Motorola, Inc., Schaumburg, Ill.

[21] Appl. No.: 115,078

[22] Filed: Sep. 2, 1993

[51] Int. Cl.⁶ ............................................ H02M 3/335
[52] U.S. Cl. ....................................................... 363/21
[58] Field of Search ........................ 363/20, 21, 39, 41, 363/45, 46, 74, 78; 361/111

[56] References Cited

U.S. PATENT DOCUMENTS

| | | | |
|---|---|---|---|
| 4,301,497 | 11/1981 | Johari | 363/21 |
| 4,303,874 | 12/1981 | Iwai | 318/331 |
| 4,322,817 | 3/1982 | Kuster | 363/41 |
| 4,425,612 | 1/1984 | Bahler et al. | 363/21 |
| 5,122,945 | 6/1992 | Marawi | 363/21 |

Primary Examiner—Steven L. Stephan
Assistant Examiner—Matthew V. Nguyen
Attorney, Agent, or Firm—James A. Coffing; Timothy W. Markison

[57] ABSTRACT

In a power supply that includes switch-mode feedback, output transient responses can be minimized by first detecting a predetermined load change. Once the load change has been detected, the switch-mode feedback is adjusted for a predetermined period of time to a maximum level for load increases or to a minimum level for load decreases. When the predetermined period of time elapses, the switch-mode feedback is adjusted to an output voltage dependent mode of operation.

8 Claims, 2 Drawing Sheets

METHOD FOR MINIMIZING OUTPUT TRANSIENT RESPONSES IN A POWER SUPPLY

FIELD OF THE INVENTION

The present invention relates generally to power supplies and, in particular, to minimizing output transient responses in power supplies.

BACKGROUND OF THE INVENTION

Power supplies are used in transmitters to supply power to the transmitter. Typical power supplies used in transmitters operate in a closed loop system whereby the voltage is monitored and adjusted based on the output of the transmitter. When the transmitter is keyed up, a large step in the output current occurs. This large step in the output current results in a large voltage droop of the power supply. Since the power supply is required to provide some minimum voltage to the transmitter during the step of current, if the transient response of the power supply is inadequate, the voltage will droop too low, which causes the transmitter to shut down and the station will not key up.

In a typical power supply control loop, practical limitations force the loop crossover to be much less than what is theoretically possible (typically 1/10-¼ of the switching frequency). Because of this, large output transients, such as those produced by transmitters, cause the output voltage of the supply to droop until the feedback loop can recover (which may be several seconds).

One solution to improve output transient responses is to provide post regulation on the output of the power supply. The post regulator adds voltage to the output when the transient occurs to reduce the droop. While this approach works fairly well, it requires a substantial amount of circuitry to implement. For example, a second potential source is needed, which may be an additional secondary on the transformer of the supply that is filtered and rectified, and a second control loop. If the second control loop is not properly compensated, the switch-mode loop and the second loop may interfere with each other, causing the power supply to become unstable.

Therefore a need exists for a method to minimize output transient responses in a power supply without the need for a substantial amount of additional circuitry.

DESCRIPTION OF A PREFERRED EMBODIMENT

Generally, the present invention provides a method for minimizing output transient responses in a power supply. This is accomplished by sensing a predetermined output load change and adjusting a switch-mode feedback to a maximum or minimum level for a predetermined period, wherein the duration of the predetermined period of time is based on the predetermined output load change. When the predetermined period of time elapses, the switch-mode feedback is adjusted to an output voltage dependent mode of operation. By adjusting the switch-mode feedback based on the output load change, the output load can be adjusted in large increments without substantial voltage swings, or transients. Thus, power supplies utilizing the present invention provide substantial constant output voltages to elements they power regardless of step load changes and without the need for a substantial amount of additional circuitry.

Figure 1:
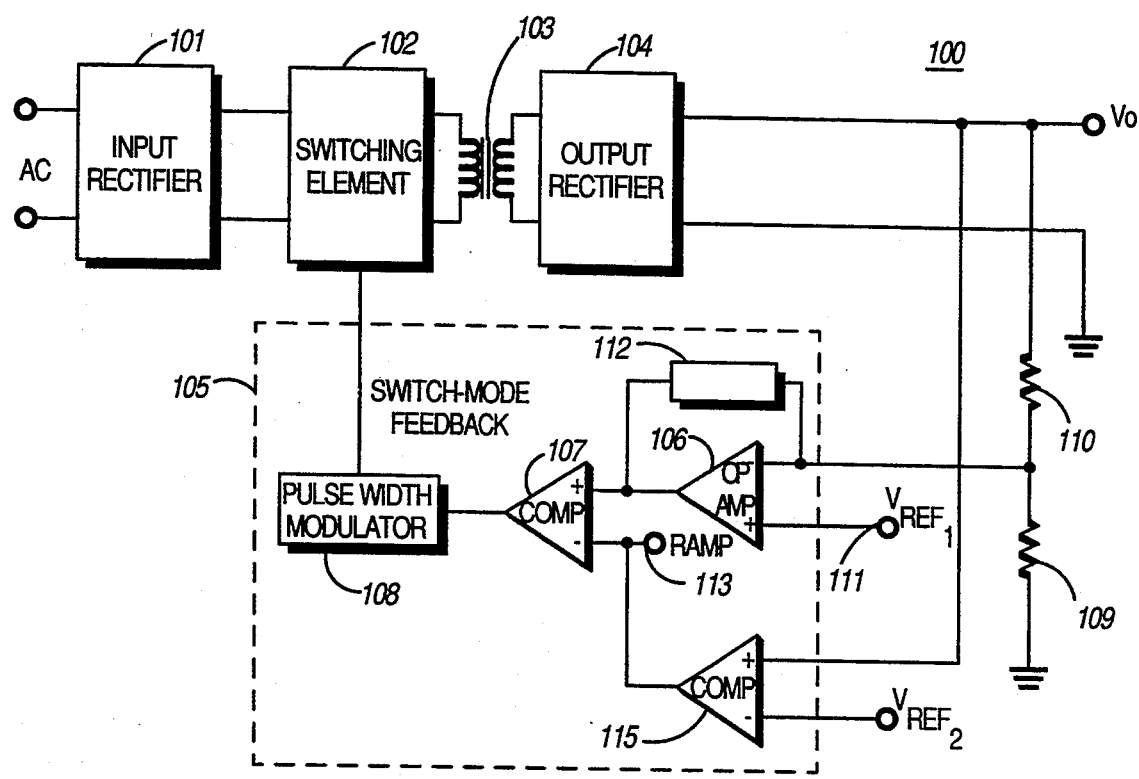
FIG. 1 illustrates a power supply in accordance with the present invention.

The present invention can be more fully described with reference to FIGS. 1-3. FIG. 1 illustrates a power supply (100) that comprises an input rectifier (101), a switching element (102), a power coupling transformer (103), an output rectifier and filter (104), and switch-mode feedback circuitry (105). The switch-mode feedback circuitry (105) comprises an operational amplifier (106) with feedback compensation network (112), a comparator (107), pulse width modulator (108), and an additional comparator (115). Output voltage (Vo) is scaled appropriately to the control section by resistor divider (109, 110). Vref1 (111) and Vref2 (114) are DC (direct current) voltages set to an arbitrary value, such as 2 V–4 V, to provide DC references. The ramp (113) is a sawtooth ramp and is used to provide pulse width modulation at the output of the comparator (107).

The input rectifier (101) converts standard line voltage, for example 115 V at 60 Hz, into a DC voltage which is used to supply the switching element (102) with a DC voltage. The switching element (102) is typically a power transistor, a pair of transistors, or two pairs of transistors. The number of transistors used depends on the power supply topology. For example, if the power supply has a forward or buck converter topology, only one transistor is used. If the power supply has a half bridge or full bridge converter topology, then one pair or two pair of transistors are respectively used.

The switching element (102) converts the DC voltage from the input rectifier (101) into a high frequency (typically 100 kHz) AC (alternating current) voltage. The high frequency voltage is applied to the power coupling transformer (103) which provides a voltage increase or decrease at the secondary windings and an isolation boundary between the AC input and DC output. The AC voltage thus appearing on the secondary side of the power coupling transformer (103) is converted back into DC by the output rectifier (104).

The elements that make up the switch-mode feedback (105) are often combined into a single integrated circuit, which functions in the following manner. The output voltage, Vo, is sensed by the resistor divider network (109,110) and sent to the inverting input of the operational amplifier (106). The non-inverting input connects to a fixed voltage reference (111). The operational amplifier (106) amplifies the difference between the voltage reference and the divided down Vo, and creates a control signal to the comparator stage (107). A voltage ramp (113) is applied to the other input of the comparator stage (107). The output of the comparator (107) is a logic '1' whenever the ramp voltage (113) is less than the output of the operational amplifier (106), and a logic '0' when the opposite is true. When the comparator output (107) is a logic '1', the pulse width modulator (108) turns the switching element (102) on, thus applying voltage to the transformer (103) and ultimately to the output load. When the comparator output (107) is a logic '0', the pulse width modulator (108) turns the switching element (102) off, thus disconnecting the voltage from the transformer (103). Since the ramp (113) has a periodicity defined by a system clock (not shown), the switching element (102) also is turned on and off with the same periodicity (for example at 100 kHz). The amount of time that the switch (102) remains in either the on or off state depends on the input voltage, output voltage, and output load current, but in any case it is arranged such that if the output voltage drops then the switch (102) stays on longer and if the output voltage rises it stays on less.

As mentioned in the background section, when load changes occur on an output of the power supply (100) without the present invention, the output voltage droops for load increases and increases for load decreases. This occurs because the power supply (100) can not respond instantaneously to a change in load. When the load increases, energy is removed from the output capacitors (contained in the output rectifier (104)) and the switch-mode feedback loop attempts to replace the energy, but because this adjustment can take from a few periods to several hundred periods of the power supply system clock, the output droops. On the other hand, if the load decreases, the energy stored in filter inductors of the output rectifier (104) boosts the output voltage taking the switch-mode feedback circuitry several clock cycles to compensate. The present invention minimizes these load transient responses (droops and boosts) by the logic diagram of FIG. 2.

Figure 2:
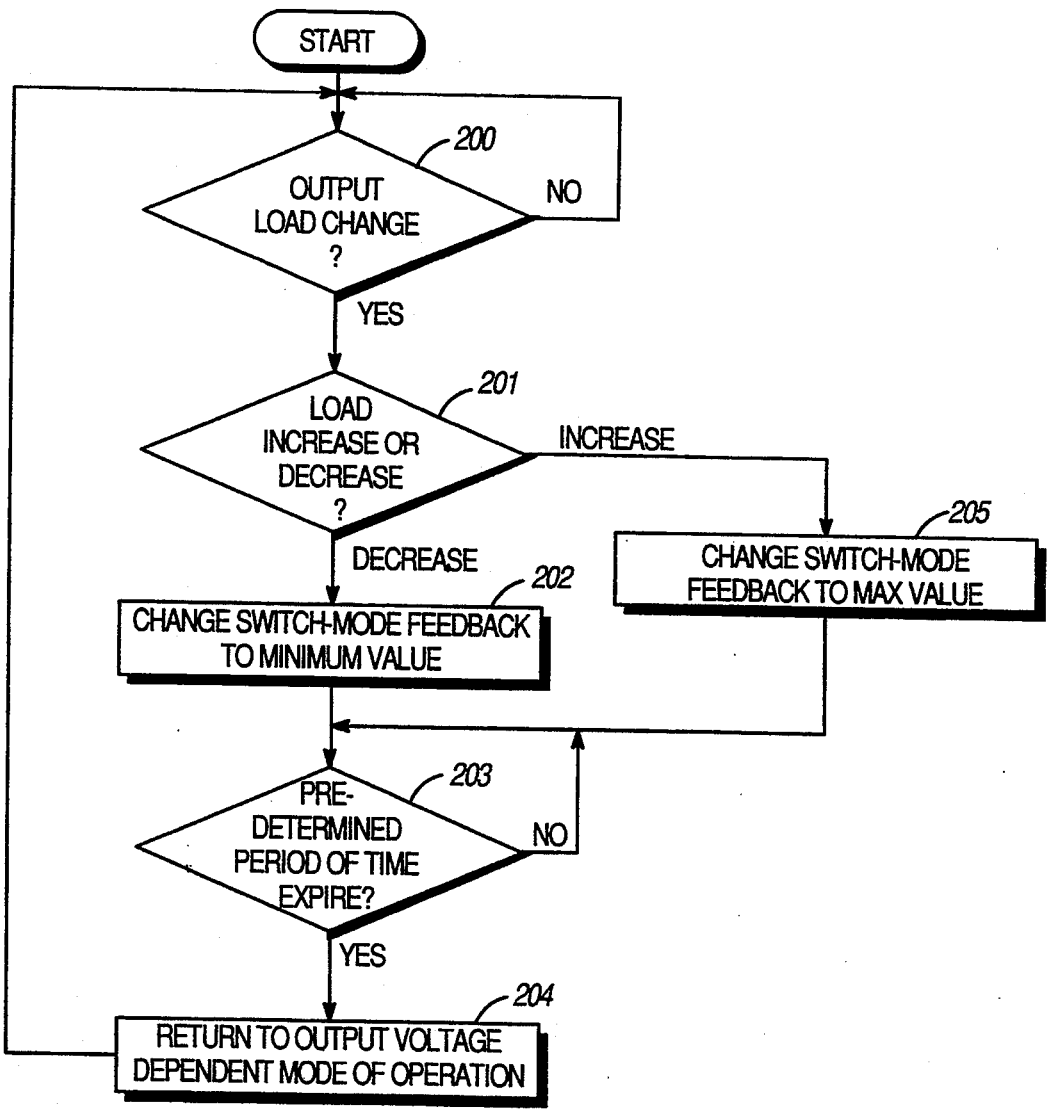
FIG. 2 illustrates a logic diagram that a power supply may use to implement the present invention.

In FIG. 2, the process begins at step 200, where a test is done to detect that a load change has occurred. Basically, one could use a circuit to detect either a DC level change or a rate of change of the output depending on the particular load or power supply application. The change could be detected by measuring either voltage or current, and it could be measured at any node or branch in the circuit that is directly related to the output load. Often a primary side current transformer is used to detect output load current since it is directly related to the output by the turns ratio of the transformer. If DC level changes are to be detected, a window comparator would be a reasonable way to sense the change. If a change over time is the desired method, then a capacitor coupled circuit feeding current into a resistor could be used as the detector. The time constant of the capacitor-resistor combination would be set to only detect rates of change larger than a predetermined value. If the load change is always the same such as what might be the case for a motor turning on, then a signal could be obtained directly from the circuit which creates the load change.

Once the load change has been detected (200), if the load change indicates that the output voltage is decreasing (load is increasing) (201), then the appropriate action is to switch the feedback mode into a state such that the switching element immediately goes to its maximum on time (205). This is accomplished by comparator (115) in FIG. 1, by effectively reducing the ramp signal to zero. This forces the output of comparator (107) to a logical '1' value, and thus the switch goes to a maximum on time without incurring the delay penalty of elements (106, 109, 110, and 112) in the switch-mode feedback circuitry. The majority of the delay in the switch-mode feedback circuitry is caused by the feedback compensation network (112) which is required for stability and noise immunity in a typical power supply.

If the load change indicates that the output voltage is increasing (load is decreasing) (201), the logic flow is the same as described above, except that the switch-mode feedback system would switch to a minimum switch on time mode of operation (202). One method to force the switch-mode feedback system to a minimum switch on time is for the comparator (115) to switch its output to a voltage higher than the ramp voltage, thus overriding the action of the ramp in the circuit. Both circuits can be combined so that the power supply can respond with minimal delay to either increasing or decreasing load changes.

Once the load change has been detected and appropriate action taken, the next step is to decide when to exit the maximum or minimum switch time mode (203). This can be accomplished in the same manner as detecting the onset of the load change. Either a DC level or rate of change of voltage can be detected and when the value falls within predetermined limits the system can exit from this mode and return to the voltage dependent mode of operation. In the case of known load changes (again, for example, turning on a motor), a timer circuit can be initiated at the onset of the load change, and terminated at a time determined by the characteristics of the load. For example, if it is known that a motor turn on surge lasts 200 milliseconds, then the timer could be set to terminate just prior to 200 milliseconds to revert back to the voltage dependent mode of operation (204).

Figure 3:
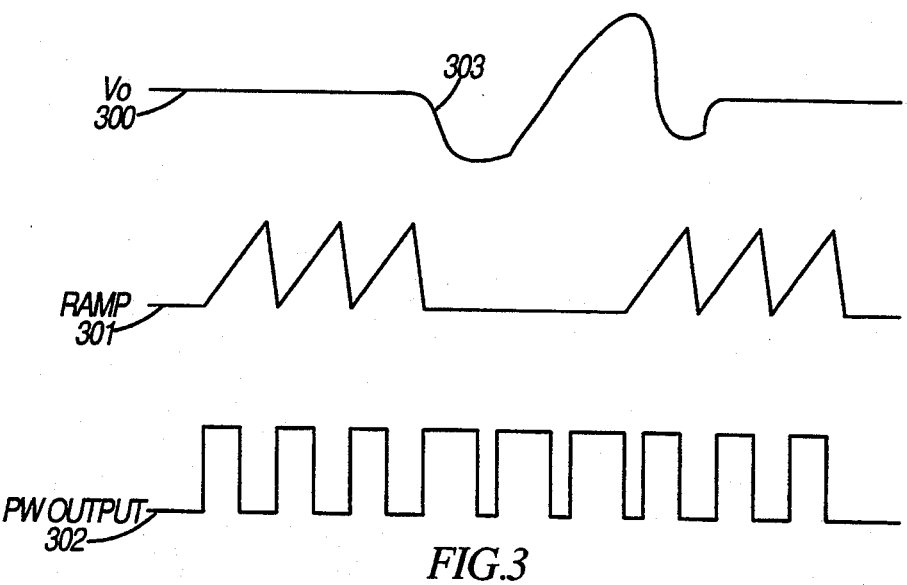
FIG. 3 illustrates a timing diagram when a load change occurs in accordance with the present invention.

FIG. 3 illustrates a timing diagram indicating operation of the present invention when an increasing load change occurs. Initially the output voltage Vo (300) is constant, and the width of the pulses generated by the pulse width modulator (302) is also constant. When a load change occurs (303) the voltage starts to droop. When the sensing circuit detects that the voltage has drooped too much, the comparator output reduces the ramp signal to zero (301) which causes the pulses from the pulse width modulator to go immediately to the maximum obtainable value. This causes the energy flow to the output to go immediately to the maximum obtainable value, thus, causing the output voltage to return to its normal value at the maximum possible rate. When the voltage has returned within appropriate limits, the ramp is restored and the pulse width control then returns to the normal control block, causing the pulse width to reduce to a level appropriate to the load.

The present invention provides a method for minimizing output transient responses in a power supply that includes a switch-mode feedback. By sensing a predetermined output load change and adjusting the switch-mode feedback to a maximum or minimum level for a predetermined period of time based on the predetermined output load change, the output load can be adjusted in a rapid manner which eliminates the possibility of systems powered by the power supply shutting down due to extreme and rapid output load changes. In addition, the present invention allows power supplies to provide a substantial step load change with minimum voltage droop over a prior art power supply.

I claim:

1. In a power supply that includes switch-mode feedback, a method for minimizing transient responses at an output node, the method comprises the steps of:
   a) sensing an actual load increase at the output node to produce a sensed load increase;
   b) when the sensed load increase exceeds a predetermined value, for a predetermined period of time, adjusting the switch-mode feedback to a maximum level, wherein the predetermined period of time is based on the predetermined load increase; and c) when the predetermined period of time expires, adjusting the switch-mode feedback to an output voltage dependent mode of operation.

2. In the method of claim 1, the sensing of the actual load increase of step (a) further comprises sensing load current of the output load.

3. In the method of claim 1, the sensing of the actual load increase of step (a) further comprises sensing output voltage of the output load.

4. In the method of claim 1, the adjustment of the switch-mode feedback of step (b) further comprises providing maximum input to a pulse width modulator of the switch-mode feedback.

5. In a power supply that includes switch-mode feedback, a method for minimizing transient responses at an output node, the method comprises the steps of:
   a) sensing an actual load decrease at the output node to produce a sensed load decrease;
   b) when the sensed load decrease exceeds a predetermined value, for a predetermined period of time, adjusting the switch-mode feedback to a minimum level, wherein the predetermined period of time is based on the predetermined load decrease; and
   c) when the predetermined period of time expires, adjusting the switch-mode feedback to an output voltage dependent mode of operation.

6. In the method of claim 5, the sensing of the actual load decrease of step (a) further comprises sensing load current of the output load.

7. In the method of claim 5, the sensing of the actual load decrease of step (a) further comprises sensing output voltage of the output load.

8. In the method of claim 5, the adjustment of the switch-mode feedback of step (b) further comprises providing minimum input to a pulse width modulator of the switch-mode feedback.

* * * * *